(No Model.)
T. T. PROSSER.
Car Wheel.
No. 231,095. Patented Aug. 10, 1880.
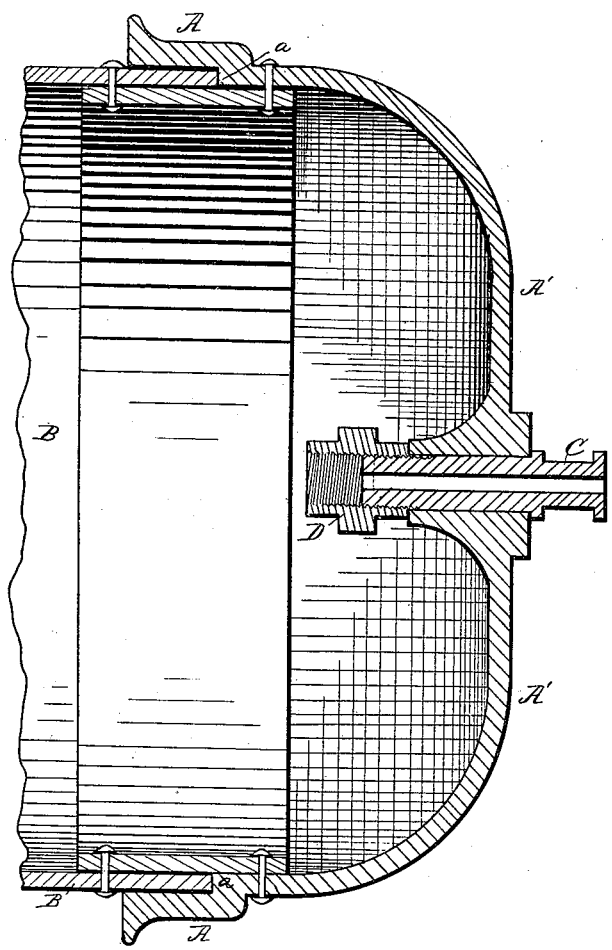
Witnesses.
C. A. Neale
J. J. McCarthy.
Inventor.
Thos. T. Prosser
by his attorney

UNITED STATES PATENT OFFICE.

TREAT T. PROSSER, OF CHICAGO, ILLINOIS.

CAR-WHEEL.

SPECIFICATION forming part of Letters Patent No. 231,095, dated August 10, 1880.

Application filed May 10, 1880. (No model.)

*To all whom it may concern:*

Be it known that I, TREAT T. PROSSER, a citizen of the United States, residing at Chicago, in the county of Cook and State of Illinois, have invented certain new and useful Improvements in Cylinder Car-Wheels, (Case A;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to rolling-cylinder freight-cars of the character described in various United States patents granted to me on the 17th day of February, 1880, and more particularly to the car described and claimed in United States Patent No. 224,724.

The object of the invention is to construct the wheels of such cars of cast metal in such a way that they may serve the twofold purposes of wheels and heads for such car.

To this end the invention consists of a wheel composed of the usual flanged tread or tire and a dome-shaped web, all cast in one piece, the flanged tire being adapted to receive the end of the cylinder, and the dome-shaped web forming an extension of the cylinder for receiving and carrying part of the load.

The annexed drawing is an axial section of the improved wheel for cylinder freight-cars, showing one end of the cylinder within the tire of the wheel.

The flanged tire A of the wheel resembles, in cross-section, the tire of an ordinary car-wheel; but it is bored so as to fit snugly on the end of the shell B of a cylinder freight-car, such as described in the above-mentioned United States patents.

The tire A is formed on and constitutes the base of the dome-shaped web A' of the wheel. The dome-shaped web may be somewhat flattened at the apex, as shown, and is formed or provided with a central hub, $A^2$, bored for the reception of the gudgeon or journal C, firmly secured in the hub.

The gudgeon is made tubular, and projects with its inner end through the hub. This inwardly-projecting end is screw-threaded to receive a union or coupling, D, for connecting to it a perforated ventilating-tube.

An interior shoulder, $a$, is formed in the wheel to serve as an abutment for the end of the shell of the cylinder-car, which may be riveted to the wheel.

It will be observed that the dome-shaped web of this wheel forms an extension of the cylindrical shell of the cylinder-car, and that by reason of this dome-shaped web the tire of the wheel will possess a certain degree of elasticity, which is very desirable, because it eases shocks, and thereby reduces wear and tear on the track as well as on the car itself.

The interior shoulder of the wheel is of some importance, because its presence will relieve part of the strain on the rivets by which the shell may be secured to the wheel. The shoulder is a continuous annular one.

Having thus described my invention, what I claim as new is—

1. A cast car-wheel composed, substantially as before set forth, of a flanged tire and a dome-shaped web, the flanged tire having a cylindrical bore, so that the wheel can be fitted upon and secured to the end of a cylindrical car.

2. A cast car-wheel composed of a flanged tire and a dome-shaped web, and provided with an interior shoulder, substantially as before set forth.

In testimony whereof I affix my signature in presence of two witnesses.

TREAT T. PROSSER.

Witnesses:
 H. B. PROSSER,
 H. W. ANDERSON.